Patented Apr. 17, 1934

1,955,348

UNITED STATES PATENT OFFICE 1,955,348

MODIFIED CASTOR OIL

Wendell M. Stanley, Munich, Germany, assignor to E. I. du Pont de Nemours & Company, Wilmington, Del., a corporation of Delaware No Drawing. Application March 27, 1931,
Serial No. 525,877

12 Claims. (Cl. 87—12)

This invention relates to new compounds comprising a modified form of castor oil, and to nitrocellulose coating compositions containing these compounds.

Films of nitrocellulose coating compositions are ordinarily brittle unless some material has been added to impart flexibility. Castor oil has found extensive use as a softening agent for pyroxylin films, but the use of this material is attended by certain disadvantages. Castor oil reacts with oxygen to such an extent that it soon becomes rancid and, in addition, the castor oil softened film loses its flexibility upon ageing.

This invention has as an object the production of castor oil in a modified form which is more stable than castor oil as regards rancidity development. A further object is a process of manufacturing the aforesaid modified castor oil. A still further object is the production of improved coating compositions which contain the modified castor oil as a softening agent. Other objects will appear hereinafter.

These objects are accomplished by the following invention in which castor oil is heated with selenium powder and the modified castor oil so produced is incorporated into nitrocellulose coating compositions.

Castor oil, consisting chiefly of the glyceride of ricinoleic acid, turns rancid by oxidation at the double bonds, and when such rancidification occurs, a brittleness of the softened nitrocellulose film develops. I have discovered that when castor oil is heated with small amounts of selenium powder, preferably less than 2%, a change in the properties of the castor oil is obtained. This new castor oil does not turn rancid so rapidly as castor oil, and as a consequence, a pyroxylin film softened with it retains its flexibility much longer on ageing.

The following example is illustrative of the method employed in the preparation of this new compound.

A mixture of 2,000 parts of castor oil and 2 parts of selenium powder is heated for three hours at 250° C. The mixture at this point appears to be the very same as castor oil. The mixture is allowed to cool and to stand several days. It changes over into a pasty mass containing about 37% of a white solid and about 63% of a liquid very similar to castor oil. The separation of this mixture is accomplished by treating 10 parts of the mixture with 25 parts of petroleum ether or other aliphatic hydrocarbon solvents. The liquid portion dissolves the petroleum ether, and is thereby thinned. The solid portion can be removed by filtering and further purified by a similar washing with petroleum ether. The liquid portion which has been diluted with petroleum ether is heated until no more petroleum ether is evolved (about 2 hours at 150° C. is sufficient). In the treatment of castor oil with selenium, the amount of solid portion decreases as the length of time of heating is increased.

It is to be noted that heating is necessary and that the modified castor oil cannot be produced by merely treating castor oil with selenium at room temperature. At temperatures of 150° C. or less the reaction appears to be extremely slow. A temperature of 200° C. is satisfactory, and since the decomposition temperature of castor oil is about 300° C., I prefer to conduct the reaction between 200° C. and 300° C.

A typical example of a nitrocellulose composition containing these improved softeners for use in coating fabrics for the preparation of artificial leather follows:

| | Parts by weight |
|---|---|
| Pyroxylin | 1 |
| Solid portion of selenium treated castor oil | 1½ |
| Pigment | 1 |
| Solvent | 4.25 |

A typical example of a nitrocellulose composition containing these improved softeners for use in clear lacquers follows:

| | Parts by weight |
|---|---|
| Pyroxylin | 12 |
| Damar gum | 3 |
| Dibutyl phthalate | 4 |
| Liquid portion of selenium treated castor oil | 2.6 |

With respect to the coating compositions it will be apparent that different ratios of the various constituents, given in the two examples, may be used. In the second example, for instance, a pigmented formula may be substituted instead of the clear, or other changes may be made in the nitrocellulose compositions containing these improved softeners. Various well known ingredients for cellulose derivative coating compositions may be mixed with the modified castor oil or otherwise incorporated into the coating composition. Among these ingredients may be mentioned oils; plasticizers such as tricresyl phosphate, damar, ester gum, etc.; and natural resins as well as various synthetic resins such as oil modified polyhydric alcohol polybasic acid resins. It is not necessary to separate the solid and liquid portions and use one of these portions only in the coating composition as indicated in the examples. The mixture obtained by directly heating castor oil with selenium may be used without separation of the constituents, or various proportions of the different isolated forms may be incorporated in the coating compositions.

In view of the fact that selenium cannot be detected by analytical methods in either the liquid or solid portion and since there is no apparent change in the acetyl and iodine numbers or in the molecular weight, it would appear that the modified forms are isomers of castor oil and are probably stereoisomers. These products, or the product constituted by their mixture, regardless of what their exact constitution may be, are for the purposes of the present invention, referred to in the claims as modified castor oil.

Nitrocellulose coating compositions made with my improved softening agents are especially valuable, because of the lasting flexibility of the films yielded, for coating of fabrics or materials with flexible backs and for the production of artificial leather types of products.

The modified castor oil in both of the forms mentioned exhibits some marked differences from ordinary raw castor oil, as exemplified by the white solid portion which has a melting point of about 58° C. and by the higher viscosity of the liquid portion, which is about 11 poises at 25° C. as compared to 6 poises for castor oil at the same temperature. The raw castor oil becomes rancid in one or two days at 65° C. whereas the liquid and solid modifications showed no rancidity at the end of 50 days under the same conditions. A test for determining the amount of oxygen which reacts with both forms of the modified oil and with ordinary castor oil disclosed that the modified products absorbed less than 6% of their weight of oxygen; while ordinary castor oil absorbs about 30% of its weight of oxygen. The absorption test was made by dissolving raw castor oil in benzol, saturating a weighed filter paper with the solution, evaporating off the solvent and re-weighing the filter paper. The filter paper so impregnated with castor oil was then exposed to oxygen for 500 hours at 65° C. in a special apparatus. This test was then repeated in the same manner and under the same conditions with the liquid modification and then with the solid modification. The ordinary castor oil was found to absorb 30% of its weight of oxygen whereas the liquid form of the modified castor oil absorbed but 5% of its weight of oxygen and the solid form absorbed only 2%.

As many apparently widely different embodiments of this invention may be made without departing from the spirit and scope thereof, it is to be understood that I do not limit myself to the specific embodiments thereof except as defined in the appended claims.

I claim:

1. A process of manufacturing modified castor oil which comprises heating castor oil with selenium.

2. A process of manufacturing modified castor oil which comprises heating castor oil with selenium powder in an amount less than 2% by weight of the castor oil.

3. A process of manufacturing modified castor oil which comprises heating castor oil within the temperature range of about 200° C. to about 300° C. for about 3 hours with about 0.1% by weight of selenium.

4. A process of manufacturing modified castor oil which comprises heating castor oil with selenium, and treating the modified castor oil formed to separate the solid portion from the liquid portion.

5. A process of manufacturing modified castor oil which comprises heating castor oil with selenium, treating the pasty mass formed with a solvent for the liquid portion, separating the solid portion from the thinned liquid portion and distilling off the solvent.

6. Modified castor oil, which as compared to castor oil, absorbs less oxygen, is less subject to becoming rancid and which is obtainable by heating castor oil with about 0.1% of selenium powder.

7. Modified castor oil, obtainable by heating castor oil with selenium, which shows no appreciable rancidity after a period of fifty days at 65° C. and which absorbs less than 8% of its weight of oxygen when exposed to air for 500 hours at a temperature of 65° C.

8. Modified castor oil comprising a mixture of a solid portion having a melting point of about 58° C. and a liquid having a viscosity of about 11 poises at 25° C., said modified castor oil being substantially identical with that obtainable by heating castor oil with about 0.1% of selenium powder.

9. A modified castor oil comprising a solid at ordinary temperature obtainable by heating castor oil with about 0.1% of selenium powder.

10. Modified castor oil comprising a solid having a melting point of about 58° C., said modified castor oil being substantially identical with that obtainable by heating castor oil with about 0.1% of selenium powder.

11. Modified castor oil comprising an oil obtainable by heating castor oil with about 0.1% of selenium powder.

12. Modified castor oil comprising an oil having a viscosity of about 11 poises at 25° C., said modified castor oil being substantially identical with that obtainable by heating castor oil with about 0.1% of selenium powder.

WENDELL M. STANLEY.